US012677363B2

(12) United States Patent
Kotal et al.

(10) Patent No.: US 12,677,363 B2
(45) **Date of Patent: *Jul. 7, 2026**

(54) LIGHTING DEVICE AND LIGHTING SYSTEM COMPRISING THE LIGHTING DEVICE

(71) Applicant: LEDVANCE GmbH, Garching bei Munchen (DE)

(72) Inventors: Patrick Kotal, Regenstauf (DE); Krister Bergenek, Regensburg (DE); Shijun Nie, Garching (DE)

(73) Assignee: LEDVANCE GMBH, Garching bei Munchen (DE)

( * ) Notice: Subject to any disclaimer, the term of this patent is extended or adjusted under 35 U.S.C. 154(b) by 17 days.

This patent is subject to a terminal disclaimer.

(21) Appl. No.: 18/379,456

(22) Filed: Oct. 12, 2023

(65) Prior Publication Data

US 2024/0040683 A1 Feb. 1, 2024

Related U.S. Application Data

(63) Continuation of application No. 17/828,302, filed on May 31, 2022, now Pat. No. 11,800,618, which is a continuation of application No. 17/206,715, filed on Mar. 19, 2021, now Pat. No. 11,399,423.

(30) Foreign Application Priority Data

Mar. 19, 2020 (DE) ..................... 10 2020 107 571.5

(51) Int. Cl.
*H05B 45/46* (2020.01)
*H05B 45/24* (2020.01)
*H05B 47/19* (2020.01)

(52) U.S. Cl.
CPC ............ *H05B 45/46* (2020.01); *H05B 45/24* (2020.01); *H05B 47/19* (2020.01)

(58) Field of Classification Search
CPC ........ H05B 45/46; H05B 45/24; H05B 47/19; H05B 45/20; H05B 45/10; H05B 45/12
See application file for complete search history.

(56) References Cited

U.S. PATENT DOCUMENTS 9,179,512 B2 * 11/2015 Ni .......................... H05B 45/48
9,788,373 B1 10/2017 Chowdhury
9,844,114 B2 * 12/2017 Chowdhury ........... H05B 45/48
(Continued)

FOREIGN PATENT DOCUMENTS

DE 102013104998 A1 11/2014

*Primary Examiner* — Minh Tran
(74) *Attorney, Agent, or Firm* — Hayes Soloway PC

(57) ABSTRACT

A lighting device including an LED light source, wherein the LED light source includes a first LED strand for generating a first light with a first correlated color temperature and a second LED strand for generating a second light with a second color temperature different from the first color temperature. The lighting device further comprises control electronics with a controllable LED driver for driving the LED light source, wherein the control electronics comprise a switch for switching between the first LED strand and the second LED strand so that either the first LED strand or the second LED strand is activated depending on the switch position. A lighting system comprising the lighting device is further disclosed.

20 Claims, 5 Drawing Sheets

(56) References Cited

U.S. PATENT DOCUMENTS

| | | | | |
|---|---|---|---|---|
| 10,517,156 | B1 | 12/2019 | Qiu et al. | |
| 10,772,169 | B1 | 9/2020 | Qiu | |
| 10,874,006 | B1 * | 12/2020 | Davis | H05B 45/48 |
| 11,800,618 | B2 * | 10/2023 | Kotal | H05B 47/19 |
| 2014/0232288 | A1 | 8/2014 | Brandes et al. | |
| 2015/0326117 | A1 * | 11/2015 | Tischler | H05B 45/3725<br>315/185 R |
| 2016/0252940 | A1 | 9/2016 | Farrell et al. | |
| 2017/0064785 | A1 * | 3/2017 | Kim | H05B 45/46 |
| 2018/0231226 | A1 * | 8/2018 | Koo | H05B 45/46 |
| 2019/0110343 | A1 | 4/2019 | Van Kaathoven et al. | |
| 2019/0373699 | A1 | 12/2019 | Chen et al. | |

* cited by examiner

LIGHTING DEVICE AND LIGHTING SYSTEM COMPRISING THE LIGHTING DEVICE

CROSS-REFERENCE TO RELATED APPLICATIONS AND PRIORITY

This patent application is a Continuation of U.S. patent application Ser. No. 17/828,302, filed on May 31, 2022, which is a Continuation of U.S. patent application Ser. No. 17/206,715, filed on Mar. 19, 2021, which claims priority from German Patent Application No. 10 2020 107 571.5, filed on Mar. 19, 2020. Each of these patent applications is herein incorporated by reference in its entirety.

TECHNICAL FIELD

The present disclosure relates generally to a lighting device. More particularly, the present disclosure relates to a lighting device having an integrated controller and a lighting system based thereon.

BACKGROUND

Controllable lighting devices, such as lamps or luminaires which allow color, temperature and/or brightness of room lighting to be changed, are known to mimic the progression of natural daylight in terms of color temperature or Correlated Color Temperature (CCT) and brightness for the well-being of the user. The control of such systems is complex, making the use and distribution of such systems difficult.

It is a goal of the present disclosure to provide a controllable lighting device that is easy to manufacture.

SUMMARY

According to one aspect of the present disclosure, a lighting device is provided for achieving this goal. The lighting device includes an LED light source, wherein the LED light source includes a first LED strand for generating a first light, in particular a first white light, with a first correlated color temperature CCT1, and a second LED strand for generating a second light, in particular a second white light, with a second correlated color temperature CCT2 different from CCT1. The lighting device may be designed as a light source, lamp and/or luminaire.

The lighting device may further include control electronics with a controllable LED driver for driving the LED light source. The control electronics include a switch which may have at least two switch positions for switching between the first LED strand and the second LED strand, so that either the first LED strand or the second LED strand may be activated or deactivated depending on the switch position.

The lighting device may further include a third LED strand for generating a third LED light, in particular a third white light, with a third correlated color temperature CCT3 different from the first correlated color temperature CCT1 and the second correlated color temperature CCT2, wherein the third LED strand may be driven by the LED driver independently of the switch position.

Thus, the activation of the third LED strand does not depend on the switch position such that the third strand may always be activated when the lighting device is put into operation. Consequently, the third LED strand and the first or second LED strand, depending on the switch position, may contribute to the illumination of the lighting device. Due to the differences between the lights generated by the first and second LED strands, by switching the switch between the first and second LED strands, the operating modes of the lighting device or the light characteristics of the light generated by the lighting device, in particular CCT, can be influenced in a simple way.

In particular, the third LED strand may be connected in parallel to the first or second LED strand. The parallel connection of the third LED strand to the first or second LED strand has the effect that, based on intrinsic differences between the electrical characteristics of the LEDs in different LED strands, the relative utilization of individual LED strands to one another depends on the current level of the electrical power or voltage supplied by the LED driver. In particular, when the lighting device is dimmed or brightened, this may affect not only the luminous flux of the light generated by the lighting device, but also its color temperature.

Thus, a simple tunable white light source may be provided without having to drive the individual LED strands separately, especially by separate power circuits.

The control unit may be designed to detect an actuation of a switching device, in particular a switching device provided for switching on or for supplying power to the illuminating device, and to flip the switch based on the detected actuation of the switching device. In particular, the control electronics may include a switch controller for controlling the switch, wherein the switch controller may be configured to detect an actuation of the switching device and to flip the switch based on the detected actuation of the switching device. The control unit or the switch controller may be configured such that the flipping of the switch or a change from one operating mode to another operating mode may be performed by switching off and then switching on the switching device again within a predefined time. Thus, it may be possible to switch between the operating modes of the lighting device with an external switch in a simple manner.

The control electronics may further be designed to detect a confirmation of a switching device designed as a light switch and to flip the switch based on the detected actuation. The switch-off and switch-on operations or a sequence of switch-off and switch-on operations of the light switch may thereby be used as commands for the power electronics to flip the switch, and in this simple manner to switch the lighting device from one operating mode to another operating mode.

The control electronics may also be designed to detect a confirmation of a switching device designed as a dimmer, such as a phase-cut dimmer, and to flip the switch based on the detected actuation of the dimmer. Thus, conventional (i.e., pre-installed) dimmers may be used to control the operating mode of the lighting device.

The LED driver may be designed as a so-called "dimmable" LED driver, such that the lighting device may be dimmed or brightened via the LED driver using a switching device designed as a dimmer, such as a phase-cut dimmer.

Due to the change in the relative utilization of the active LED strands when the luminous device is dimmed or brightened, the color temperature of the light generated by the luminous device is also influenced in the process, so that a combined luminous flux and color temperature effect or flux and CCT dimming effect may be achieved.

The first LED strand may be designed to produce a cool white light with a CCT1 in the range from 3500 K to 6500 K, in particular from 5500 K to 6500 K. The second LED strand may be designed to produce a cool white light with a CCT2 in the range from 2700 K to 5000 K, in particular from 2700 K to 3700 K. The third LED strand may be designed to produce a warm white light with a CCT3 in the range from 1500 K to 3000 K, in particular from 1800 K to 2300 K. The color temperatures may be achieved by a suitable selection of LEDs. The third LED strand may include at least one warm white LED and the first or second LED strand may include at least one cool white LED.

Due to the differences in color temperature and because of the intrinsic differences or asymmetry between the LEDs of different LED strands, when dimming or reducing the output voltage of the driver, the utilization of individual LED strands may change in such a way that a kind of glow dimming effect may be achieved. In this process, the color temperature of the light generated by the lighting device decreases with the falling light intensity, which creates a pleasant light bulb effect.

The LED strands or the control electronics may be designed in such a way that the maximum luminous flux of the light generated by the first LED strand (Phiv_max1) or the maximum luminous flux of the light generated by the second LED strand (Phiv_max2) is higher than the maximum luminous flux of the light generated by the third LED strand (Phiv_max3). Specifically, the maximum luminous fluxes Phiv_max1, Phiv_max2 and Phiv_max3 generated by the LED strands may have the following relationship: Phiv_max1≥Phiv_max2>Phiv_max3, in particular Phiv_max1>Phiv_max2>3×(Phiv_max3). Due to these ratios between the maximum luminous fluxes of the different LED strands, the glow dimming effect, especially at low luminous fluxes, can be correlated with a high luminous efficacy, especially at high luminous fluxes.

In some embodiments, the lighting device may have at least one controller for separately controlling at least one of the LED strands. By separately controlling the LED strands, in particular the third LED strand, the lighting behavior of the lighting device or the glow-dim effect described above may be actively influenced.

The controller may have a feedback input for detecting a feedback signal and be designed to control the third LED strand based on the feedback signal from the first or second LED strand. Based on the feedback signal, the third LED strand may be controlled taking into account the utilization of the first or second LED strand, respectively, so that the lighting behavior of the lighting device or the glow dimming effect may be controlled more precisely.

At least one of the LED strands may have at least one passive electrical component, in particular at least one electrical resistor or series resistor. By adding passive electrical components, in particular electrical resistors or series resistors, differences in the electrical characteristics of the LED strands, for example due to different forward voltages of different LEDs, may be partially compensated for or even amplified, such that the lighting behavior or lighting characteristic of the lighting device is specifically influenced.

In further embodiments, the illuminating device, in particular the control electronics of the illuminating device, may include a wireless communication interface by which the illuminating device may be wirelessly controlled. Via the wireless communication interface, the illuminating device may be wirelessly controlled, for example, with a control device or remote control.

In accordance with a further aspect of the present disclosure, a lighting system is provided. The lighting system may include a lighting device and a switching device, in particular for starting up or supplying power to the lighting device, wherein the control electronics may be adapted to detect an actuation of a switching device and to flip the switch based on the detected actuation of the switching device. Thus, it may be possible to switch between the operating modes of the illuminating device with an external switch in a simple manner.

The switching device may be designed as a dimmer, such as a phase-cut dimmer, and the control electronics may be designed to detect an actuation of the dimmer, in particular a switch-on or switch-off operation and/or a dimming or brightening operation, and to control the LED strands of the lighting device accordingly.

The dimmer may include a communication interface for wireless communication, and may be adapted to be controlled by one or more control signals from a control device to be controlled via the communication interface. The control unit may have a standardized communication interface, especially according to one of the standard protocols, such as ZigBee WiFi® or BLE®, such that the lighting device may be controlled remotely using a standard protocol. The dimmer may be adapted to be controlled using a mobile application of a mobile control device, such as a smartphone or tablet. The application or mobile application may be configured to send control signals to the communication interface of the dimmer that cause the dimmer to control the lighting device accordingly. This means that the lighting device may be controlled easily using a mobile device.

The lighting device may be in the form of an illuminant, lamp, or luminaire so that the lighting system may be implemented in various configurations as needed.

The control device or the mobile application may be configured in such a way that the control signal for the dimmer control is time-dependent, date-dependent and/or location-dependent, in particular that HCL or HCL-like operation of the lighting device may be achieved when the dimmer is controlled, whereby the brightness or the luminous flux and the CCT of the light generated by the lighting device follows the natural course of the day, in particular based on circadian rhythm. The circadian flux CCT curves may, for example, be stored as location and date-dependent curves in the memory of the control device or may be retrieved from the cloud.

The lighting system may further include a sensor system, for example a sensor system implemented in the control device, including one or more light sensors for determining a current daylight level or the amount of daylight currently present in the environment, wherein the control device may be configured to control the light generated by the lighting device based on the current daylight level. By adjusting the light generated by the illuminating device according to the daylight level, the operation of the illuminating device may be optimized to achieve an appropriate brightness overall, in particular by the light generated by the illuminating device and the daylight together. In this way, unnecessary energy consumption in the lighting system may be avoided.

The lighting system may further include a motion sensor for detecting a presence of a person and the sensor interface may be designed to receive motion sensor data, wherein the control unit may be designed to control the lighting device based on the motion sensor data. Thus, the operation of the lighting device may be made dependent on whether persons are present in the area to be illuminated, whereby the energy efficiency of the lighting system may be further increased.

DETAILED DESCRIPTION OF THE DRAWINGS

Figure 1:
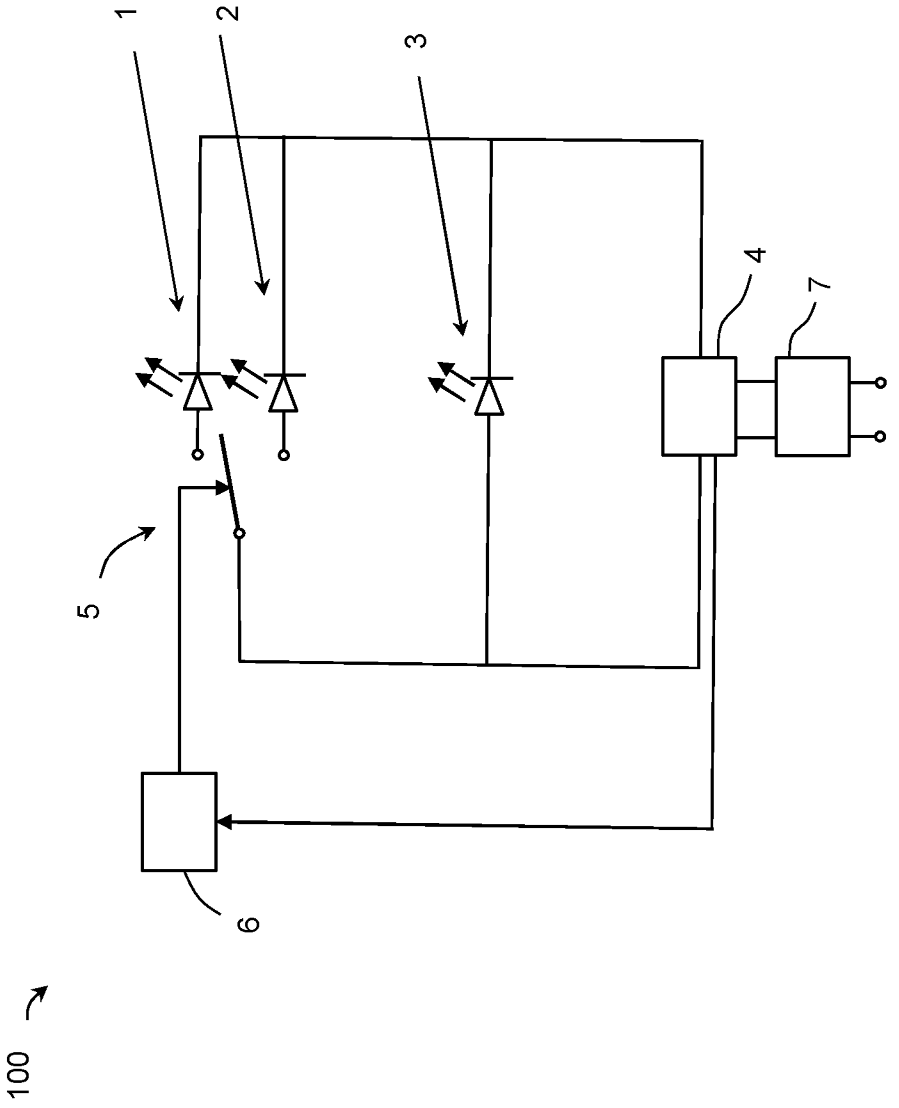
FIG. 1 illustrates a schematic view of an electrical circuit of a lighting device in accordance with an embodiment of the present disclosure.

FIG. 1 illustrates a schematic view of an electrical circuit of a lighting device in accordance with an embodiment of the present disclosure. The electrical circuit of the lighting device 100 may include a controllable LED light source with a first LED strand 1, a second LED strand 2, and a third LED strand 3. The lighting device 100 may further include control electronics with an LED driver 4, a switch 5 and a switch controller 6.

The LED driver 4 may be designed to supply electrical current to the LEDs in the first LED strand 1, the second LED strand 2, and the third LED strand 3. In accordance with the embodiment of FIG. 1, the LED driver 4 may be designed as a dimmable LED driver, which may be controlled with a dimmer, particularly with a phase-cut dimmer. FIG. 1 shows a dimmer 7 to which the LED driver 4 may be electrically connected. The dimmer 7 may be designed as a phase-cut dimmer by which the LED driver 4 may be controlled so that the light generated by the lighting device 100 may be dimmed or brightened by means of the dimmer 7.

The first LED strand 1, the second LED strand 2, and the third LED strand 3 may each have one or more LEDs. In particular, the LED strands 1, 2, and 3 may each have series-connected LEDs, parallel-connected LEDs, or a combination of series-connected and parallel-connected LEDs. The first LED strand 1 may be designed to generate a white light with a first correlated color temperature CCT1 of about 6000 K. The second LED strand 2 may be designed to generate a white light with a second correlated color temperature CCT2 in the range from about 4000 K to about 6000 K. The third LED strand may be designed to generate a white light with a third correlated color temperature CCT3 of about 2000 K.

The switch 5 may be adapted to switch between the first LED strand 1 and the second LED strand 2, such that either the first LED strand 1 or the second LED strand 2 may be deactivated depending on the switch position or switch setting. The switch 5 may be controlled by the switch controller 6, which may adapted to detect an actuation of the dimmer 7 and may flip the switch 5 if the detected actuation of the dimmer 7 is taken by the switch controller 6 as a command to flip the switch 5. Thus, the first LED strand 1 or the second LED strand 2 may be activated or deactivated by the user as required.

The switch controller 6 may be electrically connected to the LED driver 4 on the input side and to the switch 5 on the output side. The switch controller 6 may be designed such that an actuation of the dimmer 7 may be detected by the switch controller 6, in particular to recognize so-called "fast clicks," for example if two or more clicks occur within a short time (e.g., 2 s) at the dimmer 7. The detected fast clicks may then be interpreted by the switch controller 6 as a command to flip the switch 5, whereupon the switch controller 6 may control the switch 5 such that the switching position of the switch 5 may be flipped. Thus, a fast click may be used to switch between the first LED strand 1 and the second LED strand 2 to change the lighting behavior of the lighting device.

The differences (e.g., intrinsic differences) in electrical characteristics, such as impedance forward voltages, etc., of the individual LED strands 1, 2 and 3, may create the condition that when the lighting device 100 is dimmed, for example by means of a phase-cut dimmer, glow dim effect may occur as a system intrinsic property or as an integral functionality of the circuit, such that when the lighting device is brightened or the luminous flux of the generated light is increased, the color temperature of the generated light may also increase.

Accordingly, the color temperature of the light produced may be reduced when the light fixture is dimmed.

Figure 2:
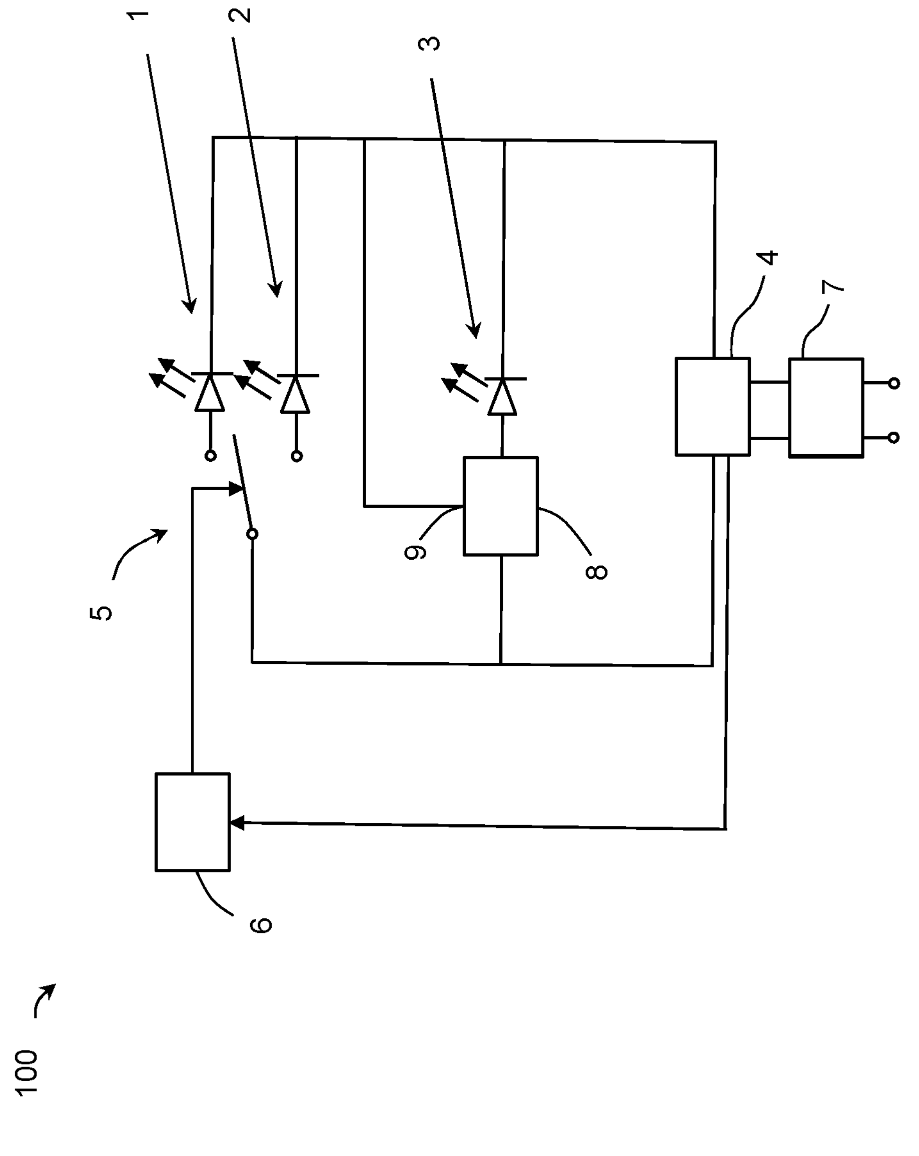
FIG. 2 illustrates a schematic view of an electrical circuit of a lighting device in accordance with another embodiment of the present disclosure.

FIG. 2 illustrates a schematic view of an electrical circuit of an electrical device in accordance with another embodiment of the present disclosure. The electrical circuit shown in FIG. 2 is similar to the electrical circuit of FIG. 1 and additionally may include a controller 8. The controller 8 may be connected in series with the LEDs in the third LED strand 3 and may be designed to control the third LED strand 3 separately from the other LED strands 1 and 2. The controller 8 may include a feedback input 9 for detecting a feedback signal from the first LED strand 1 or from the second LED strand 2. The controller 8 may be designed to control the third LED strand 3, taking into account the feedback signal from the LED strands 1 and 2, respectively, in such a way as to achieve a predetermined or desired color temperature of the overall light generated by the lighting device 100.

Figure 3:
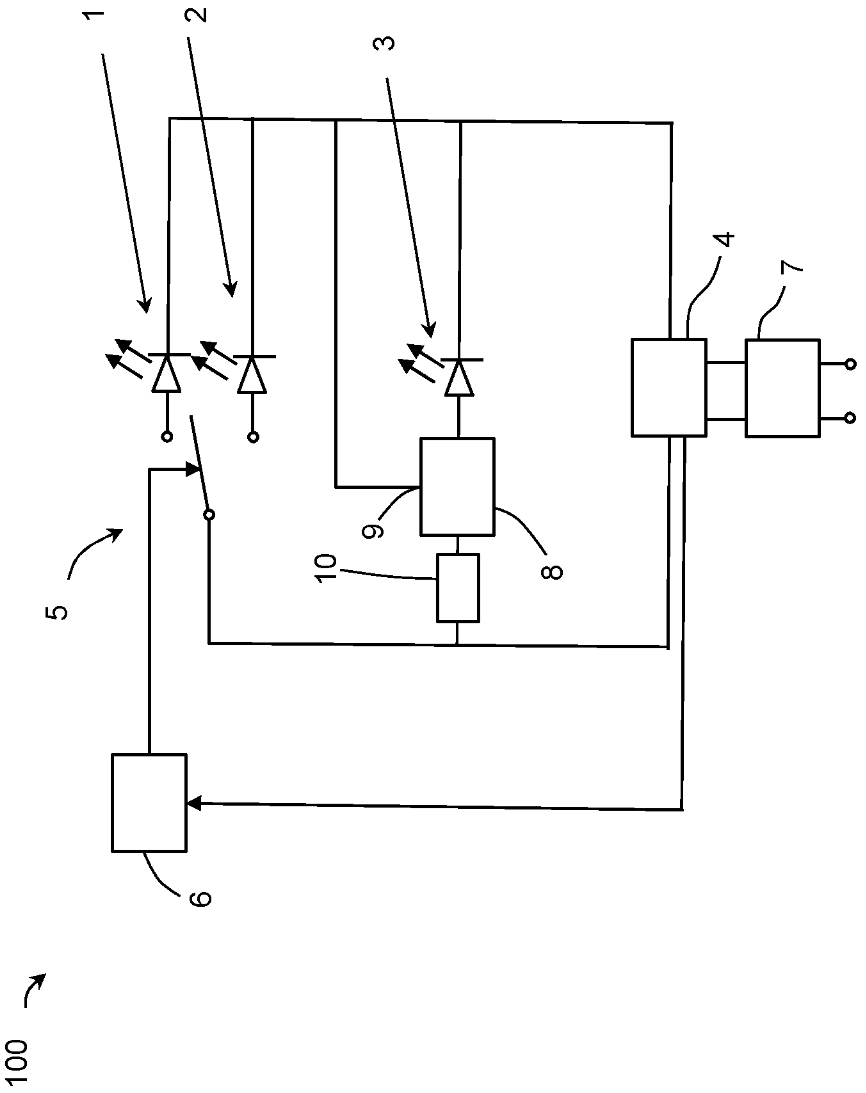
FIG. 3 illustrates a schematic view of an electrical circuit of a lighting device in accordance with a further embodiment of the present disclosure.

FIG. 3 illustrates a schematic view of an electrical circuit of an electrical device in accordance with a further embodiment of the present disclosure. The circuit of FIG. 3 is similar to the circuit shown in FIG. 2 and additionally may include a series resistor 10, which may connected in series with the LEDs in the third LED strand 3 and the controller 8.

In some embodiments, one or more resistors (e.g., series resistors) and/or other passive electronic components may be connected in one or more LED strands 1, 2 and 3. By means of the series resistors and/or by means of the other passive electrical components, characteristics of LED strands 1, 2 and 3, influenced by different forward voltages of different LEDs, may be influenced such that the luminous behavior or light characteristic of the lighting device may be specifically influenced.

As an example, the third LED strand 3 may have a lower forward voltage than the first LED strand 1 or the second LED strand 2, especially with the same number of LEDs. The third LED strand 3 may then draw a disproportionately high current from the LED driver 4, particularly at low electrical voltages, and accordingly light up more intensely relative to the other two LED strands 1 or 2. This may lead to the suppression of the illumination of the first and second LED strands 1 and 2, respectively, especially when dimming or at low dimming levels of the lighting device 100.

By flipping the switch 5 (e.g., by actuating or fast-clicking the dimmer) the lighting behavior or lighting characteristics of the lighting device 100 may be influenced during operation. For example, if the switch 5 is flipped such that the second LED strand 2 is deactivated, only the first LED strand 1 and the third LED strand 3 may contribute to light generation. The resulting light or white light may in this instance have a CCT in the range between 2000 K and 6000

K. Alternatively, if the switch 5 is flipped such that the first LED strand 1 is disabled, only the first LED strand 2 and the third LED strand 3 may contribute to light generation. The resulting light may then have a CCT in the range between 2000 K and 4000 K. Compared to the constellation when the second LED strand 2 is deactivated, the overall color spectrum of the resulting light will be shifted to the "warmer" spectral range.

The lighting device 100 may enable click-dim control, whereby two different color temperature luminous flux dimming (CCT & Flux-Dim) curves are realized. Depending on which of the two LED strands 1 or 2 is activated, different dim-to-warm curves may be achieved. Dim-to-warm curves are dependencies between the luminous flux and the color temperature, where the dimming (i.e., the decrease of the luminous flux) may be accompanied by the decrease of the color temperature. This may cause, among other things, a so-called "dimming glow effect," such that when the lighting device 100 is dimmed down, the color temperature of the light may shift in the warm white direction, similar to incandescent bulbs.

Switching between the two dependency curves may thereby be performed by switching between the first LED strand 1 and the second LED strand 2 by the switch 5 in the manner described above. In doing so, the switch controller 6 may detect an actuation (e.g., successive ON/OFF events) at the dimmer 7 and may flip the switch 5 if necessary.

Figure 4:
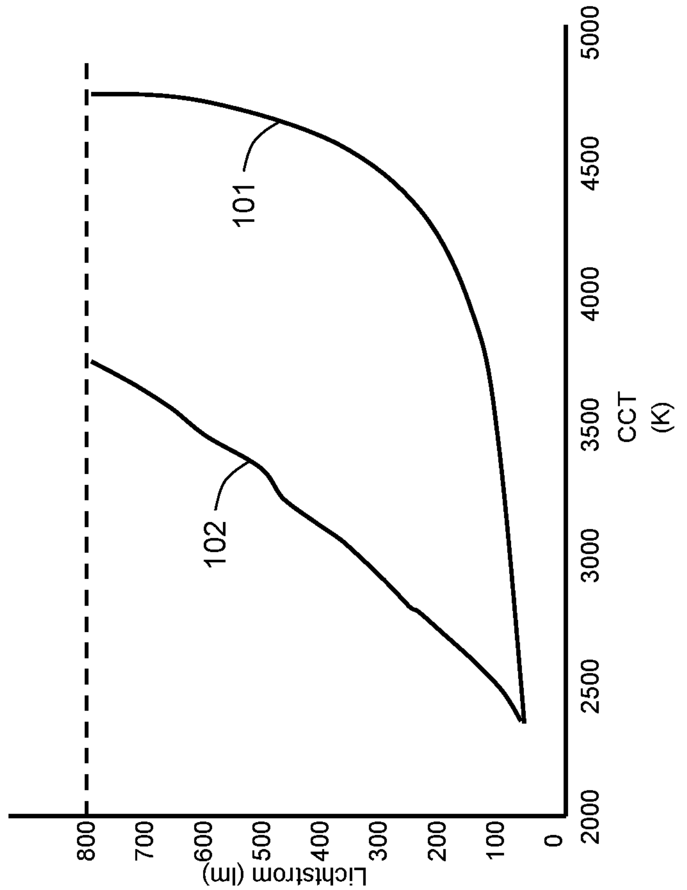
FIG. 4 illustrates dependencies between luminous flux and color temperature for a lighting device in accordance with an embodiment of the present disclosure.

FIG. 4 illustrates dependencies between luminous flux and color temperature for a lighting device in accordance with an embodiment of the present disclosure. Two dependency curves 101 and 102 are shown in FIG. 4. The dependency curves 101 and 102 correspond to two different operating states or different switching positions of the switch 5. Such or similar curves may be generated when dimming or brightening a lighting device 100 according to FIG. 1, 2 or 3.

The first dependency curve 101 shows the dependency between luminous flux and the color temperature of the light generated by the lighting device 100 in the operating condition when the second LED strand 2 is deactivated, such that only the first LED strand 1 and the third LED strand 3 contribute to light generation.

The second dependency curve 102 shows the dependency between luminous flux and the color temperature of the light generated by the lighting device 100 in the operating condition when the first LED strand 1 is deactivated and is contributed to light generation only by the second LED strand 2 and the third LED strand 3.

The two dependency curves 101 and 102 cover essentially the same luminous flux range between a minimum luminous flux of about 50 lm and a maximum luminous flux of about 800 lm, although the color temperature ranges of the two curves may differ significantly. The color temperature range of curve 101 may extend to a maximum value of about 4800 K, while the color temperature range of curve 102 may extend to about 3800 K. The minimum value of the color temperature for both curves may be about 2400 K. A characteristic of both curves 101 and 102 may be monotonic increase in color temperature or CCT with increasing luminous flux. The color temperature may increase as the luminous device 100 is brightened, and the color temperature may decrease as the luminous device 100 is dimmed. This luminous behavior of the luminous device 100 corresponds to the glow-dim effect similar to incandescent bulbs.

Compared to the dependency curve 102, the dependency curve 101 is shifted overall to higher color temperatures, with the color temperature increasing steeper when the luminous flux is brightened or increased. This lighting behavior of the lighting device 100 may promote concentration and alertness in humans, and therefore may also be referred to as an active operating mode or "active mode."

In dependency curve 102, the color temperature increases slower with the increasing luminous flux, essentially linearly smooth. The slow increase of the color temperature with the luminous flux as well as the overall lower color temperature range of the dependency curve 102 provides for a pleasant, relaxed and cozy atmosphere, which is why this operating mode of the lighting device 100 may also be referred to as "relax mode".

Figure 5:
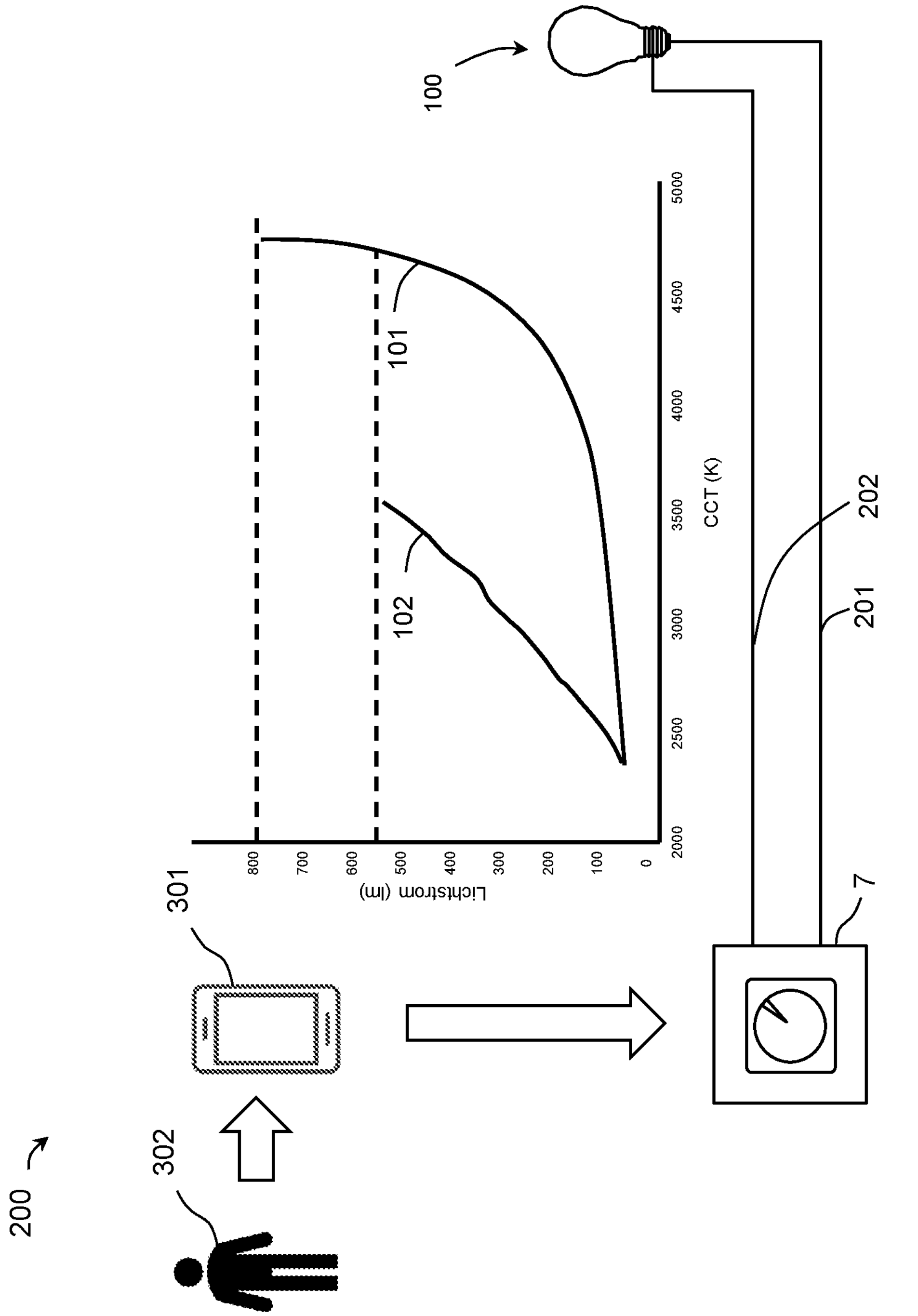
FIG. 5 illustrates a lighting system with a lighting device in accordance with an embodiment of the present disclosure.

FIG. 5 illustrates a lighting system with a lighting device in accordance with an embodiment of the present disclosure. The lighting system 200 may include a lighting device 100, wherein the lighting device 100 is shown as an LED lamp in FIG. 5.

The lighting system 200 may include a dimmer 7 having a communication interface (not shown) for wireless control of the dimmer 7. The communication interface may be formed as a standardized communication interface for controlling the dimmer 7 using a standard protocol, such as ZigBee WiFi®, or BLE®, such that the lighting device 100 may be remotely controlled by a control device via the dimmer 7. The dimmer 7 may be electrically connected to the lighting device 100 by electrical lines 201 and 202. The dimmer 7 may be configured as a smart phase-cut dimmer and may include a controller (not shown) configured to process signals received via the communication interface and to send corresponding control signals to the lighting device 100 via the lines 201 and 202. FIG. 5 also shows a control device 301 for remotely controlling the dimmer 7. The control device 301 may be in the form of a smartphone that can be operated by a user 302 (symbolically shown) via a smartphone application.

The control device 301 or smartphone application may provide an input interface, such as a touch screen input interface, for receiving user commands, and may be configured to send the user commands via one of the standardized communication interfaces to the remotely controlled dimmer 7 for controlling the lighting device 100. The input of the user commands and the control of the dimmer 7 by the smartphone 301 is symbolically represented by the wide arrows in FIG. 5. The remote-controlled dimmer 7 may be designed to convert the user commands from the control unit 301 via the communication interface of the dimmer 7 into control signals understandable to the control electronics of the lighting device 100 and to transmit these control signals to the lighting device 100 via the electrical lines 201 and 202. The control signals may have the same or compatible format as the control signals of a conventional phase-cut dimmer, such that the control electronics of the lighting device 100 may interpret them as the actuation of a conventional dimmer and control the LED strands 1, 2, and 3 of the lighting device 100 accordingly.

If the user enters the command to switch between two operating modes, for example from "active" to "relax", this may be received by the dimmer controller via the dimmer communication interface. The dimmer controller may then convert these commands into electrical signals, for example by disconnecting and reconnecting the electrical connection to the lighting device 100 through the lines 201 and 202. The control electronics of the lighting device 100 may take this disconnection and reconnection of the electrical connection as an "ON/OFF" event or as a fast-click and may switch the lighting device 100 from one operating mode to another operating mode by flipping the switch 5. The control device 301, or the application stored therein, may also generate time-dependent control signals that may cause the smart phase-cut dimmer to change phase cut angles. Based on the change in phase-cut angle, the control electronics of the lighting device 100 may drive the LED strands 1, 2, and 3 such that the CCT and luminous flux of the generated light are on one of the CCT&Flux dim curves intrinsic to the lighting device 100.

The control device 301 or mobile application may be configured to mimic natural daylight or provide HCL lighting by controlling the remote dimmer 7. In this regard, the illumination of the lighting device 100 may be dimmed depending on the time of day. The time dependency of the lighting behavior may be stored in the memory of the control device 301 or the smartphone and/or the dimmer 7, in particular for imitating natural daylight (HCL curve). Additionally, further HCL curves may be downloaded from the cloud via wireless communication of the control device 301 and/or the dimmer 7 and stored in the memory of the control device 301 and/or the dimmer 7. HCL curves for special purposes, such as relaxation or to promote work concentration, may also be used.

Although at least one exemplary embodiment has been shown in the foregoing description, various changes and modifications may be made. The aforementioned embodiments are examples only and are not intended to limit the scope, applicability, or configuration of the present disclosure in any way. Rather, the foregoing description provides the person skilled in the art with a plan for implementing at least one exemplary embodiment, wherein numerous changes may be made in the function and arrangement of elements described in an exemplary embodiment without departing from the scope of protection of the appended claims and their legal equivalents.

The invention claimed is:

1. A method comprising:
- operating a light emitting diode (LED) light source such that:
  - at least one LED element of the LED light source is inactive; and
  - at least two other LED elements of the LED light source are active simultaneously and have a monotonic increase in color temperature or correlated color temperature with increasing luminous flux;
  - wherein the at least one inactive LED element and the at least two other active LED elements each differ from one another in correlated color temperature.

2. The method of claim 1, wherein the at least one LED element which is inactive has a maximum luminous flux which is greater than a maximum luminous flux of the at least two other LED elements having the monotonic increase in color temperature or correlated color temperature with increasing luminous flux.

3. The method of claim 1, wherein the correlated color temperature of the at least one LED element which is inactive is in the range of 2,700-5,000 K.

4. The method of claim 1, wherein the correlated color temperature of the at least one LED element which is inactive is in the range of 3,500-6,500 K.

5. The method of claim 1, wherein the correlated color temperature of at least one of the at least two other LED elements having the monotonic increase in color temperature or correlated color temperature with increasing luminous flux is in the range of 3,500-6,500 K.

6. The method of claim 1, wherein the correlated color temperature of at least one of the at least two other LED elements having the monotonic increase in color temperature or correlated color temperature with increasing luminous flux is in the range of 2,700-5,000 K.

7. The method of claim 1, wherein the correlated color temperature of at least one of the at least two other LED elements having the monotonic increase in color temperature or correlated color temperature with increasing luminous flux is in the range of 1,500-3,000 K.

8. The method of claim 1, wherein:
- the correlated color temperature of at least one of the at least two other LED elements having the monotonic increase in color temperature or correlated color temperature with increasing luminous flux is in the range of 3,500-6,500 K; and
- the correlated color temperature of at least one of the at least two other LED elements having the monotonic increase in color temperature or correlated color temperature with increasing luminous flux is in the range of 1,500-3,000 K.

9. The method of claim 1, wherein:
- the correlated color temperature of at least one of the at least two other LED elements having the monotonic increase in color temperature or correlated color temperature with increasing luminous flux is in the range of 2,700-5,000 K; and
- the correlated color temperature of at least one other of the at least two other LED elements having the monotonic increase in color temperature or correlated color temperature with increasing luminous flux is in the range of 1,500-3,000 K.

10. The method of claim 1, wherein at least one of the at least two other LED elements having the monotonic increase in color temperature or correlated color temperature with increasing luminous flux is connected in parallel to:
- the at least one LED element that is inactive; and
- at least one other of the at least two other LED elements having the monotonic increase in color temperature or correlated color temperature with increasing luminous flux.

11. The method of claim 1, further comprising:
- detecting actuation of a switching device communicatively coupled with the LED light source; and
- operating a switch element communicatively coupled with the LED light source based on the detected actuation of the switching device.

12. The method of claim 11, wherein the switching device is configured as at least one of a light switch and a dimmer.

13. The method of claim 1, further comprising:
- controlling the LED light source in at least one of:
  - a time-dependent manner;
  - a date-dependent manner; and
  - a location-dependent manner.

14. The method of claim 1, further comprising at least one of:
- at least partially compensating for differences in electrical characteristics of the LED elements; and
- amplifying differences in electrical characteristics of the LED elements.

15. A method comprising:
- operating a light emitting diode (LED) light source such that:
  - at least one LED element of the LED light source is inactive; and
  - at least two other LED elements of the LED light source have a monotonic increase in color temperature or correlated color temperature with increasing luminous flux;

wherein the at least one LED element which is inactive and the at least two other LED elements each differ from one another in correlated color temperature; and wherein the at least one LED element which is inactive has a maximum luminous flux which is:

greater than a maximum luminous flux of at least one of the at least two other LED elements having the monotonic increase in color temperature or correlated color temperature with increasing luminous flux; and less than a maximum luminous flux of at least one of the at least two other LED elements having the monotonic increase in color temperature or correlated color temperature with increasing luminous flux.

16. The method of claim 15, wherein the maximum luminous flux of the at least one LED element which is inactive is at least three times greater than the maximum luminous flux of the at least one of the at least two other LED elements having the monotonic increase in color temperature or correlated color temperature with increasing luminous flux.

17. A method comprising:

operating a light emitting diode (LED) light source such that:

at least one LED element of the LED light source is inactive; and at least two other LED elements of the LED light source have a monotonic increase in color temperature or correlated color temperature with increasing luminous flux; and driving at least one of the at least two other LED elements having the monotonic increase in color temperature or correlated color temperature with increasing luminous flux based on a feedback signal from at least one other of the at least two other LED elements having the monotonic increase in color temperature or correlated color temperature with increasing luminous flux;

wherein the at least one LED element which is inactive and the at least two other LED elements each differ from one another in correlated color temperature.

18. A method comprising:

operating a light emitting diode (LED) light source such that:

at least one LED element of the LED light source is inactive; and at least two other LED elements of the LED light source have a monotonic increase in color temperature or correlated color temperature with increasing luminous flux; and controlling the LED light source based on at least one of:

a detected daylight level; and a detected motion;

wherein the at least one LED element which is inactive and the at least two other LED elements each differ from one another in correlated color temperature.

19. A method comprising:

operating a light emitting diode (LED) light source such that:

at least one LED element of the LED light source is inactive; and at least two other LED elements of the LED light source have a monotonic increase in color temperature or correlated color temperature with increasing luminous flux;

wherein the at least one LED element which is inactive and the at least two other LED elements each differ from one another in correlated color temperature; and wherein the LED light source is a constituent component of an LED lamp.

20. A method comprising:

operating a light emitting diode (LED) light source such that:

at least one LED element of the LED light source is inactive; and at least two other LED elements of the LED light source have a monotonic increase in color temperature or correlated color temperature with increasing luminous flux;

wherein the at least one LED element which is inactive and the at least two other LED elements each differ from one another in correlated color temperature; and wherein the LED light source is a constituent component of a luminaire.

* * * * *